United States Patent [19]

Gellert

[11] 4,433,969

[45] Feb. 28, 1984

[54] INJECTION MOLDING VALVE PIN BUSHING AND METHOD

[76] Inventor: Jobst U. Gellert, 7A Prince St., Glen Williams, Ontario, Canada

[21] Appl. No.: 399,770

[22] Filed: Jul. 19, 1982

[30] Foreign Application Priority Data

Jul. 12, 1982 [CA] Canada .................................. 407095

[51] Int. Cl.³ .............................................. B29F 1/03
[52] U.S. Cl. .................................... 425/548; 425/549; 425/566
[58] Field of Search ................ 425/564, 548, 549, 566

[56] References Cited

U.S. PATENT DOCUMENTS 4,026,518  5/1977  Gellert ........................... 425/566 X
4,380,426  4/1983  Wiles ................................... 425/566

*Primary Examiner*—Thomas P. Pavelko
*Attorney, Agent, or Firm*—Riches, McKenzie & Herbert

[57] ABSTRACT

This invention relates to an improved valve pin bushing for use in a multi-cavity valve gated injection molding system and a method of manufacture. Each valve pin bushing has a main body portion which is positioned between the end of a manifold plate arm and the heated nozzle, and a collar portion which projects from the main body portion with clearance beyond the end of the manifold plate arm. The melt passage 34 extending through the manifold plate joins a melt duct extending diagonally through the main body portion and the valve pin is snugly received in a bore in the bushing. The bore has an enlarged portion which receives the melt from the diagonal duct which then flows through the heated nozzle around the valve pin. The valve pin bushing has a peripheral flange which laterally locates it in the cavity plate to offset frictional forces from thermal expansion of the manifold plate. The valve pin bore is interrupted by a circumferential opening in the collar portion which vents corrosive gases through a vent duct in the main body portion. The valve pin bushing is manufactured by first separately machining and drilling the main body and collar portions to form the circumferential opening, vent duct, diagonal melt duct and bolt holes. The collar portion is then brazed to the main body portion in a vacuum furnace to form an integral unit which is then centrally drilled to provide the valve pin bore. In addition to improving lateral location, this structure provides the necessary length of snugly fitting bore around the valve pin to adequately seal against leakage of the pressurized melt during operation.

7 Claims, 3 Drawing Figures

INJECTION MOLDING VALVE PIN BUSHING AND METHOD

BACKGROUND OF THE INVENTION

This invention relates to a valve gated injection molding system and more particularly to a valve pin bushing for use in such a system.

In a multi-cavity molding system in which the melt passage branches outward through a manifold plate, it is well known to provide a heated nozzle or sprue bushing seated in the cavity plate in alignment with each of the gates. As may be seen in the applicant's U.S. patent application Ser. No. 360,828 filed Mar. 23, 1982 entitled "Hydraulically Actuated Injection Molding System", the valve pin extends through the heated nozzle from the actuating mechanism to the gate. The hot manifold plate extends between the cooled back plate supporting the actuating mechanism and the cooled cavity plate in which the heated nozzle is seated. Therefore, in order to avoid alignment problems between the valve pin, the actuating mechanism and the gate due to lateral thermal expansion of the manifold plate, it is necessary that ample clearance be provided between the valve pin and the manifold plate.

The melt passage from the manifold plate joins an enlarged portion of the valve pin bore in the heated nozzle and the valve pin fits snugly in the remaining smaller portion of the bore. In order to avoid leakage of the pressurized melt as the valve pin reciprocates, it has been found that this smaller diameter portion must have a minimum length relative to the diameter of the valve pin. In the system shown in above-mentioned U.S. application Ser. No. 360,828, this structure is provided in a bushing seal which is seated in the nozzle as described in the applicant's U.S. Pat. No. 4,026,518 entitled "Bushing Seal for Valve Gated Injection Mold" which issued May 31, 1977. However, it is desirable that a system be provided which utilizes heated nozzles or sprue bushings of the type described in the applicant's U.S. patent application Ser. No. 285,260 filed July 20, 1981 entitled "Sprue Bushing Connector Assembly and Method" but, as described above, it is undesirable that the seal around the valve pin be provided by having it in contact with the manifold plate.

Furthermore, it will be appreciated that in the system described in above-mentioned U.S. application Ser. No. 285,260, when the manifold plate expands and contracts, it exerts lateral frictional forces on the heated nozzle due to the considerable bearing contact between them. This has the undesirable effect of tending to tip or cock the heated nozzle on its seat in the cavity plate which interferes with the critical alignment of the valve pin and can result in leakage of the melt.

SUMMARY OF THE INVENTION

Accordingly, it is an object of the invention to at least partially overcome these problems by providing a valve pin bushing which is located against the heater nozzle to provide a seal against leakage of the pressured melt and which may improve the lateral location of the heated nozzle in the cavity plate.

To this end, in one of its aspects, the invention provides a valve gated injection molding system having a heated nozzle seated in a well in a cooled cavity plate, a gate in the cavity plate leading to a cavity, the heated nozzle having a bore extending therethrough from a first surface into alignment with the gate, an elongated valve pin which reciprocates in the bore in the heated nozzle, actuating mechanism for driving the valve pin between open and closed positions, a melt passage which extends through a manifold plate and around the valve pin in the bore in the heated nozzle to convey pressurized melt from a molding machine to the gate, the improvement further comprising a valve pin bushing having a main body portion located between the manifold plate and the heated nozzle, the main body portion having first and second opposed surfaces and an outer periphery, a portion of the first surface abutting against the manifold plate and at least a portion of the second surface abutting against the first surface of the heated nozzle, the main body portion of the valve pin bushing having a melt duct which forms a portion of the melt passage which conveys melt to the heated nozzle and a valve pin bore which extends therethrough from the first surface to the second surface, the valve pin bushing bore receiving the valve pin therethrough whereby substantial leakage of the pressurized melt is prevented around the reciprocating valve pin with sufficient clearance provided between the valve pin and the manifold plate to avoid misalignment of the valve pin due to thermal expansion of the manifold plate.

In another of its aspects, the invention further provides a method of manufacturing an injection molding valve pin bushing having a main body portion and an integral collar portion, the main body portion having first and second opposed surfaces and an outer peripheral locating flange, the collar portion joining the main body portion at said first surface, the collar portion and the main body portions having a valve pin bore with an inner wall with a generally cylindrical shape extending therethrough, the valve pin bore having an enlarged portion extending to said second surface, the main body portion having a melt duct extending from the first surface to join the enlarged portion of the valve pin bore, the inner wall of the valve pin bore being interrupted by a circumferential opening which is vented to atmosphere through a vent duct, the circumferential opening being located in the collar portion adjacent the main body portion with the vent duct located in the main body portion, comprising the steps of machining the collar portion with a well in a first end thereof to form the circumferential opening, machining the main body portion to provide first and second opposed surfaces and an outer peripheral locating flange to predetermined dimensions, drilling the main body portion in predetermined locations to provide the melt duct and the vent duct, locating the collar portion on the main body with the first end of the collar portion against the first surface of the main body portion and the said well in the collar portion over one end of the vent duct in the main body portion, applying brazing material to the interface between the collar portion and the main body portion and brazing them in a vacuum furnace to integrally join the collar portion and the main body portion together in a predetermined configuration, and drilling the valve pin bushing in a predetermined location to form the valve pin bore in alignment with the circumferential opening, the valve pin bore having an enlarged portion extending from the second surface of the main body portion to join the melt duct.

Further objects and advantages of the invention will appear from the following description taken together with the accompanying drawings.

DESCRIPTION OF THE PREFERRED EMBODIMENTS

Figure 1:
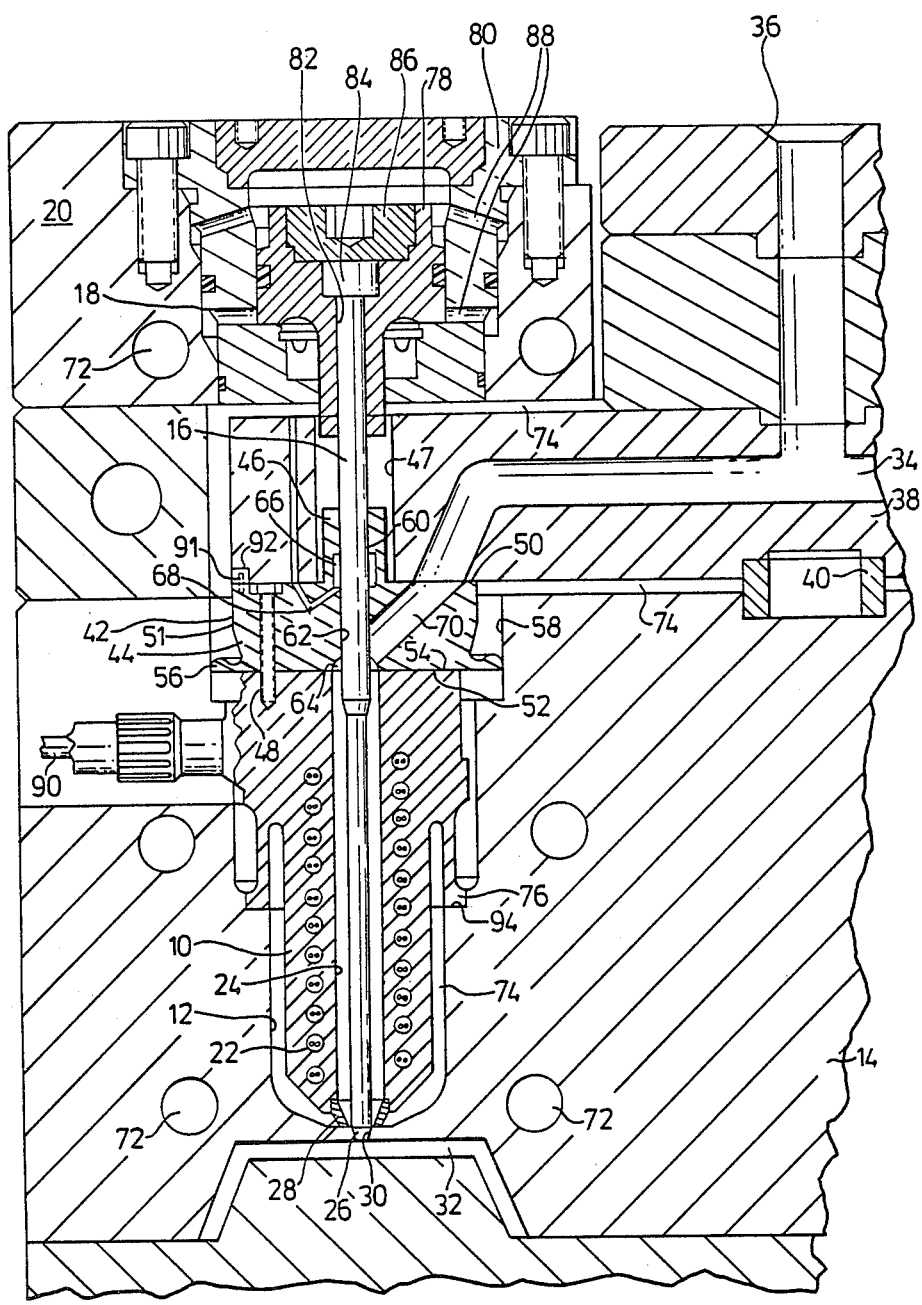
FIG. 1 is a sectional view showing a portion of a system having valve pin bushings according to the invention.

Reference is first made to FIG. 1 which shows a portion of a multi-cavity valve gated injection molding system. The portion of the system shown has a heated nozzle 10 seated in a well 12 in a cavity plate 14 with an elongated valve pin 16 driven by hydraulic actuating mechanism 18 located in back plate 20. The heated nozzle 10 has a helical electric heating element 22 which extends around a central bore 24 through which the valve pin 16 extends. The tip end 26 of the valve pin 16 extends through a hollow nozzle seal 28 seated in the heated nozzle 10 into a gate 30 leading to the cavity 32.

A melt passage 34 extends from a recessed inlet 36 where it receives pressurized melt from a molding machine (not shown) to a manifold plate 38 in which it branches outward. The manifold plate 38 is centrally laterally located relative to the cavity plate by locating ring 40 and has several outwardly extending arms, each with one of the branches of the melt passage. As may be seen, the melt passage 34 extends from the manifold plate 38, through the valve pin bushing 42 and through the bore 24 of the heated nozzle 10 around the valve pin 16. Each valve pin bushing 42 has a main body portion 44 and an integral collar portion 46 which extends into an opening 47 in the manifold plate 38. The valve pin bushing 42 is securely fixed to the heated nozzle 10 by bolts 48 and a portion of the main body portion 44 extends between the manifold plate 38 and the heated nozzle 10. The main body portion 44 has a first flat surface 50, a portion of which abuts against the manifold plate 38 and a second flat surface 52 which abuts against a first flat surface 54 of the heated nozzle 10. The outer periphery 51 of the main body portion 44 of the valve pin bushing has a locating flange 56 which extends into contact with the side 58 of the well 12 to accurately laterally locate the valve pin bushing 42.

The valve pin bushing 42 also has a central bore 60 which extends through both the collar portion 46 and the main body portion 44. The valve pin 16 extends through the bore 60 of the valve pin bushing 42 which has an inner wall 62 with a generally cylindrical shape. Although the bore 60 has an enlarged portion 64 leading to the second surface 52 of the main body portion 44, it does have a portion which snugly receives the valve pin 16 over a sufficient ratio of length to diameter to provide an effective seal against leakage of the pressurized melt around the valve pin 16. The inner wall 62 of the bore 60 is interrupted by a circumferential opening 66 which is vented to atmosphere through a vent duct 68. The main body portion 44 has a melt duct 70 which extends diagonally from the first surface 50 to join the enlarged portion 64 of the valve pin bushing bore 60 to form a portion of the melt passage 34 which conveys the melt to the cavity 32.

It is, of course, necessary that the melt be kept hot within a predetermined temperature range as it flows all the way along the melt passage 34. The nozzle 10 is heated by the heating element 22 which is cast in highly conductive copper. The steel manifold plate 38 is heated by heating device not shown and the valve pin bushing 42 which is also formed of high speed steel is heated by the hot melt flowing through them as well as by contact with the heated manifold plate and nozzle. On the other hand, the surrounding cavity plate 14 and the back plate 20 which holds the actuating mechanism 18 are cooled in a conventional manner by cooling channels 72. In order to minimize heat loss, an insulative air space or gap 74 is provided between the hot and cool components. While the air space is bridged in several places by the locating bushing portion 76 of the nozzle, the locating flange 56 of the valve pin bushing, the nozzle seal 28 and the locating ring 40, these are kept to minimum dimensions in order to reduce the heat loss through them.

The valve pin actuating mechanism 18 has a hydraulically driven piston 78 which reciprocates in a cylinder 80. The valve pin 16 extends through a central hole 82 in the piston 78 and its enlarged head 84 is secured to the piston 78 by a plug 86 which is screwed tightly down on top of it. The cylinder 80 is seated in the back plate 20 so that the valve pin 16 is in alignment with the bores through the valve pin bushing 42 and the heated nozzle 10. The piston 78 and the valve pin 16 are driven between open and closed positions by a controlled source of pressurized hydraulic fluid (not shown) which is connected to opposite sides of the piston 78 by hydraulic fluid ducts 88.

In use, following assembly of the system described above, electrical power is applied to the heating devices of the manifold 38 and to the cold terminals 90 of the heating elements 22 to heat up the nozzles 10. Pressurized melt is then introduced into the melt passage 34 from a molding machine (not shown) and controlled hydraulic pressure is applied to the fluid ducts 88 according to a predetermined cycle. When the system is assembled, the ducts for the melt passage 34 are not in perfect radial alignment with the respective melt ducts 70 in the valve pin bushings 42 but the bushings 42 are rotationally secured relative to the manifold plates 38 by pins 91 received in slots 92 in the manifold plates. As the manifold plate 38 heats up to operating temperature, it expands radially outward due to it being centrally located relative to the cavity plate 14 by locating ring 40. This thermal expansion causes each arm of the manifold plate 38 to slide across the first surface 50 of the main body portion 44 of the respective valve pin bushing 42 which is located in the cooled cavity plate 14. The system is designed so that the ducts move into alignment to provide the continuous melt passage 34 at the predetermined operating temperature. It should be pointed out that while the arms of the manifold plate 38 do expand radially outward relative to the respective valve pin housing 42 as the manifold plate heats up, there is ample clearance provided between the collar portion 46 of the valve pin bushing 42 and the opening 47 in the manifold plate 38 so that there is no contact between them in either the initial or the operating position shown in FIG. 1. Although each heated nozzle 10 is accurately located in the well 12 in the cavity plate 14 by the locating bushing portion 76 which is seated on shoulder 94 and the valve pin bushing 42 is attached to the heated nozzle 10 by bolts 48, there is still a tendency for the heated nozzle 10 to tip or cock as a result of the frictional forces from the thermal expansion of the manifold plate 38. This is offset by the provision of the locating flange 56 around the valve pin bushing which abuts against the cavity plate 14 to act as an independent lateral locator for the unit.

After sufficient melt has been injected with the valve pins 16 in the open position to fill the cavities 32 and the pressure has been held for a short packing period, the hydraulic pressure is applied to reciprocate the valve pin 16 and piston 78 to the closed position with the tip end 26 of the valve pin 16 seated in the gate 30. The melt pressure is then reduced and the position held for a cooling period before the mold is opened for ejection. After the mold is closed again, hydraulic pressuire is applied to reciprocate the valve pin 16 to the open position and the high injection pressure is reapplied. This is repeated continuously with typical cycle times of a few seconds depending upon the product being molded and the material being used. As the valve pin 16 reciprocates, there may be a slight seepage of the pressurized melt from the melt passage into the valve pin bushing bore 60 around the valve pin 16. Depending upon the material, this melt may be trapped which could result in the breakdown or decomposition of the plasticizers. This is due to the shearing action from the reciprocating motion of the valve pin on the material trapped in this confined space. This results in the formation of hot pressurized gases and acids which attack the surface of the valve pin and the wall of the bushing seal. The resulting corrosion, wear and build up of solidified material could result in seizure of the valve pin, thereby shortening the operating life of the mechanism. The provision of the circumferential opening 66 and vent passage 68 relieves the pressure on the material, allows harmful gases to escape and permits the material trapped between the valve stem and the wall of the bushing seal to remain partially fluid. The provision of this circumferential opening and vent have been found to substantially extend the operative life span of the mechanism.

Figure 2:
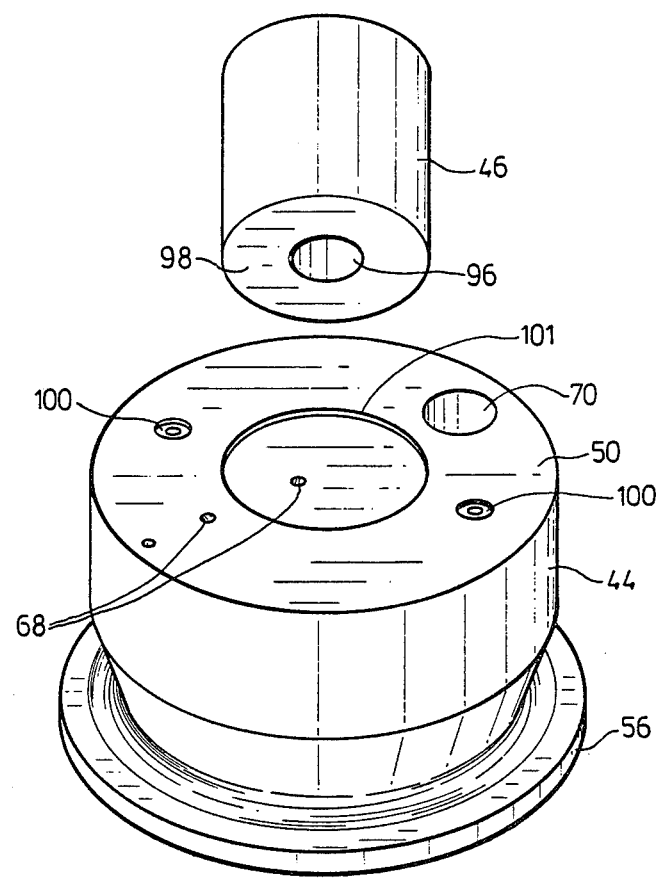
FIG. 2 is an exploded isometric view of the valve pin bushing seen in FIG. 1.
Figure 3:
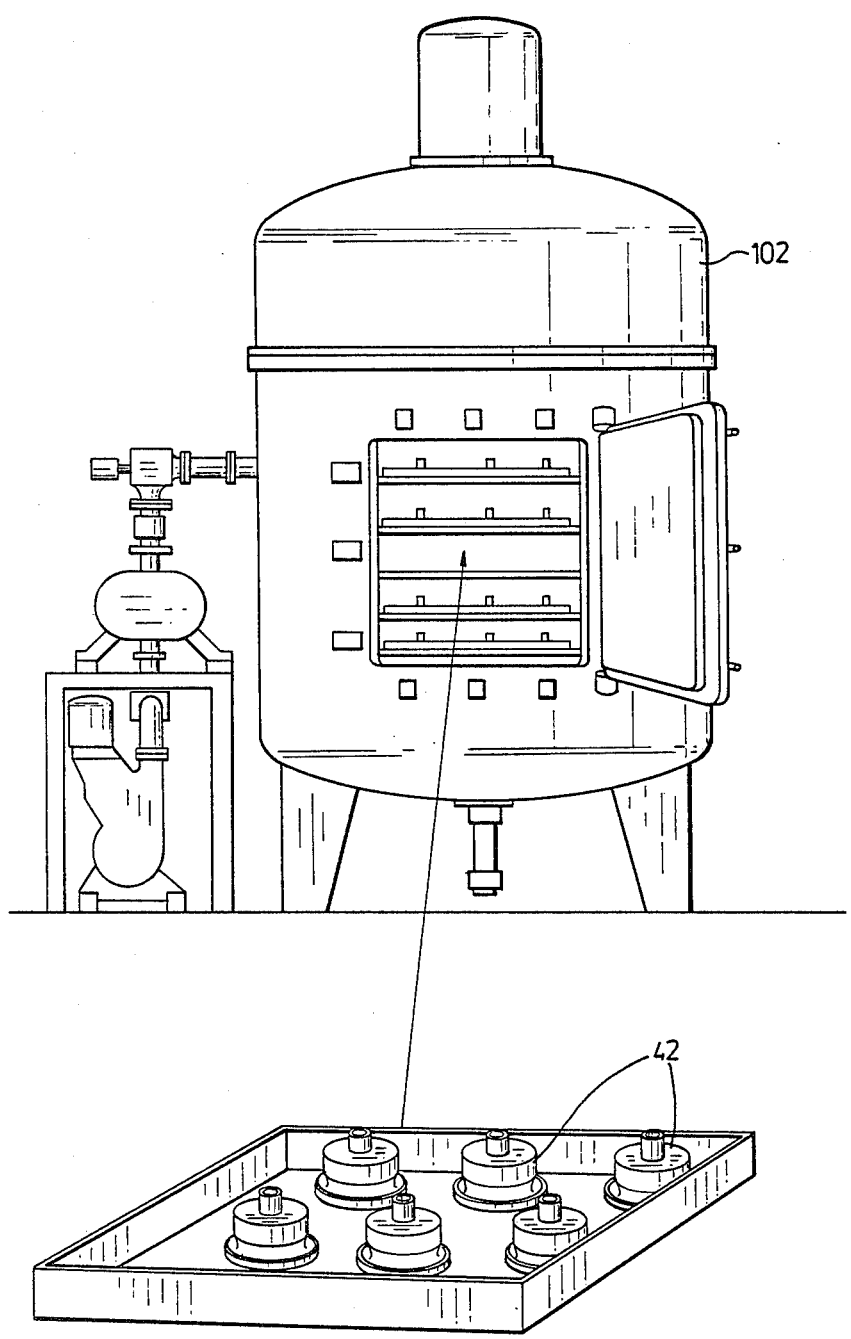
FIG. 3 shows a batch of valve pin bushings ready for insertion into a vacuum furnace.

Reference is now made to FIGS. 2 and 3 with regard to the following description of a preferred embodiment of a method of making the valve pin bushing 42 described above. The main body portion 44 and the collar portion 46 are first machined and drilled as seen in FIG. 2. The collar portion 46 has a cylindrical well 96 drilled in one end 98 to form the circumferential opening 66. The main body portion 44 is machined to have the first and second flat surfaces 50,52 and the outer peripheral locating flange 56. It is drilled to form the diagonally extending melt duct 70 and counter bored bolt holes 100, as well as a central locating recess 101. Intersecting holes are drilled at predetermined locations in the first surface 50 of the main body portion 44 to form the vent duct 68. The collar portion 46 is then positioned into recess 101 on top of the main body portion 44 in a position in which the vent duct 68 extends through the main body portion to connect to the cylindrical well 96 in the collar portion 46 near its inner wall 62.

After the two portions 44,46 have been assembled in this predetermined configuration, a nickel brazing paste is applied to the interface between them and a batch of assembled units are heated in a vacuum furnace 102 as shown in FIG. 3. The temperature and heating time must be sufficient to first melt the paste causing it to run all around the joint or interface and them braze the two portions together. As is known, brazing in a vacuum furnace provides an improved bond between the two portions which provides the valve pin bushing 42 as a strong integral unit. After completion of the brazing, the valve pin bushing 42 is drilled centrally through the well 96 to form the bore 60 with the circumferential opening 66 around it. As mentioned above, the bore 60 has an aligned enlarged portion 64 which is drilled from the second surface 52 and intersects the diagonal melt duct 68.

While the description of the valve pin bushing 42 and the method of making it have been given with respect to preferred embodiments, it is not to be construed in a limiting sense. Variations and modifications will occur to those skilled in the art. For instance, it is apparent that the valve pin bushing 42 may have structure other than the flange 56 to laterally locate it. Similarly, the vent duct 68 need not be exactly as shown, and the dimensions of the collar portion 46 and the main body portion 44 will depend upon the particular application and the ratio of valve pin bore 60 length to diameter required to provide the necessary seal. The melt duct 70 need not join the enlarged portion 64 of the bore in precisely the location shown and, in fact, they could join in the heated nozzle 10 itself, although this would be a less satisfactory arrangement. Reference is made to the appended claims for a definition of the invention.

What I claim is:

1. In a valve gated injection molding system having a heated nozzle seated in a well in a cooled cavity plate, a gate in the cavity plate leading to a cavity, the heated nozzle having a bore extending therethrough from a first surface into alignment with the gate, an elongated valve pin which reciprocates in the bore in the heated nozzle, actuating mechanism for driving the valve pin between open and closed positions, a melt passage which extends through a manifold plate and around the valve pin in the bore in the heated nozzle to convey pressurized melt from a molding machine to the gate, the improvement further comprising:

a valve pin bushing having a main body portion located between the manifold plate and the heated nozzle, the main body portion having first and second opposed surfaces and an outer periphery, a portion of the first surface abutting against the manifold plate and at least a portion of the second surface abutting against the first surface of the heated nozzle, the main body portion of the valve pin bushing having a melt duct which forms a portion of the melt passage which conveys melt to the heated nozzle and a valve pin bore which extends therethrough from the first surface to the second surface, the valve pin bushing bore having an enlarged portion extending to said second surface in alignment with the heated nozzle bore, the valve pin bushing melt duct joining the valve pin bushing bore at said enlarged portion whereby the pressurized melt flows around the valve pin to the heated nozzle, the pin bushing bore receiving the valve pin therethrough whereby substantial leakage of the pressurized melt is prevented around the reciprocating valve pin with sufficient clearance provided between the valve pin and the manifold plate to avoid misalignment of the valve pin due to thermal expansion of the manifold plate, the valve pin bushing being securely fixed to the heated nozzle with the second surface of the main body portion abutting against the first surface of the heated nozzle and a sufficient portion of the outer periphery of the main body portion of the valve pin bushing being in an abutting relationship with the surrounding cavity plate to laterally locate the valve pin bushing relative to the cavity plate.

2. An injection molding system as claimed in claim 1 wherein the valve pin bushing melt duct extends between the first surface of the main body portion and the enlarged portion of the valve pin bushing bore.

3. An injection molding system as claimed in claim 1 wherein the outer periphery of the main body portion of the valve pin bushing has a locating flange which laterally locates the valve pin bushing in the cavity plate.

4. An injection molding system as claimed in claim 1 wherein the valve pin bushing has a collar portion extending around the valve pin, the collar portion being securely fixed to the first surface of the main body portion with the valve pin bushing bore extending through both the main body portion and the collar portion to provide an extension of the valve pin bushing bore.

5. An injection molding system as claimed in claim 1 wherein the valve pin bushing bore through both the collar portion and the main body portion has an inner wall with a generally cylindrical shape, the wall being interrupted by a circumferential opening which is vented to atmosphere through a vent duct.

6. An injection molding system as claimed in claim 3 wherein the circumferential opening is located in the collar portion of the valve pin bushing adjacent the main body portion and the vent duct is located in the main body portion.

7. An injection molding system as claimed in claim 4, 5 or 8 wherein th collar portion of the valve pin bushing is integral with the main body portion of the valve pin bushing.

* * * * *